United States Patent [19]
Malchow, Jr.

[11] Patent Number: 5,807,811
[45] Date of Patent: Sep. 15, 1998

[54] WATER-BASED DRILLING FLUIDS CONTAINING PHOSPHITES AS LUBRICATING AIDS

[75] Inventor: George A. Malchow, Jr., Mentor-on-the-Lake, Ohio

[73] Assignee: The Lubrizol Corporation, Wickliffe, Ohio

[21] Appl. No.: 701,821

[22] Filed: Aug. 23, 1996

[51] Int. Cl.$^6$ .............................. C09K 7/06; B01J 13/00; C11D 17/00

[52] U.S. Cl. ..................... 507/128; 507/131; 507/133; 507/138; 507/235; 252/312; 508/434

[58] Field of Search .................................. 507/128, 235, 507/131, 133, 138; 252/304, 312; 508/434

[56] References Cited

U.S. PATENT DOCUMENTS

| | | | |
|---|---|---|---|
| 4,237,021 | 12/1980 | Andlid et al. | 252/49.5 |
| 4,312,767 | 1/1982 | Adams et al. | 252/25 |
| 4,517,112 | 5/1985 | Madris et al. | 252/309 |
| 4,540,527 | 9/1985 | Fields | 507/235 |
| 4,615,813 | 10/1986 | Bretz | 507/235 |
| 4,740,323 | 4/1988 | Suzuki et al. | 252/49.5 |
| 4,752,416 | 6/1988 | Scharf et al. | 252/304 |
| 4,770,803 | 9/1988 | Forsberg | 252/75 |
| 4,822,507 | 4/1989 | Kanamori et al. | 252/49.5 |
| 4,970,010 | 11/1990 | Erickson et al. | 252/48.6 |
| 5,262,074 | 11/1993 | Erickson et al. | 252/49.003 |
| 5,354,484 | 10/1994 | Schwind et al. | 252/32.5 |
| 5,354,485 | 10/1994 | Tipton et al. | 252/304 |
| 5,514,645 | 5/1996 | McCabe et al. | 507/238 |

*Primary Examiner*—Philip Tucker
*Attorney, Agent, or Firm*—James L. Cordek; Joseph P. Fischer; David M. Shold

[57] ABSTRACT

An oil-in-water emulsion composition is disclosed which comprises a mixture of water and
  (A) at least one oil comprising
    (1) a natural oil or synthetic triglyceride of the formula

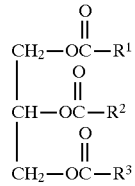

wherein $R^1$, $R^2$ and $R^3$ are independently saturated or unsaturated aliphatic groups that contain from about 7 to about 23 carbon atoms;
    (2) a synthetic ester base oil comprising the reaction of a monocarboxylic acid or a dicarboxylic acid or an aryl carboxylic acid;
    (3) an olefin;
    (4) a polyolefin;
  (B) at least one phosphite ester of the formula

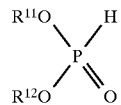

wherein $R^{11}$ and $R^{12}$ are independently aliphatic, aryl or aliphatic substituted aryl groups that independently contain from 6 to 30 carbon atoms; and
  (C) at least one emulsifier.

16 Claims, No Drawings

WATER-BASED DRILLING FLUIDS CONTAINING PHOSPHITES AS LUBRICATING AIDS

FIELD OF THE INVENTION

The present invention relates to an oil-in-water emulsion composition for water based drilling fluids and to a method of drilling a well borehole which encompasses using the environmentally friendly water based drilling fluids. In addition to water, the system comprises (A) at least one oil, (B) at least one phosphite ester, and (C) at least one emulsifier.

BACKGROUND OF THE INVENTION

The primary functions of a drilling fluid mud are: to carry chips and cuttings produced by drilling to the surface; to lubricate and cool the drill bit and drill string; to form a filter cake which obstructs filtrate invasion in the formation; to maintain the walls of the borehole; to control formation pressures and prevent lost returns; to suspend cuttings during rig shutdowns; and to protect the formation for later successful completion and shutdown.

U.S. Pat. No. 4,237,021 (Andlid et al., Dec. 2, 1980) relates to a metal working emulsion, of the oil-in-water type, based on triglyceride oils, which is adequately stable, which can be unlimitedly diluted, and which at the same time has sufficiently good and lubricating properties, without having undesirable environmental and health aspects. This reference is thus a metal working emulsion of an oil phase dispersed in a continuous water phase wherein the oil phase comprises:

0.5–50 parts by weight of triglyceride oil,
0.1–10 parts by weight of fatty acid monoglyceride,
0.05–10 parts by weight of a fatty acid, and
0.05–10 parts by weight of an alkanolamine or a fatty amine;

and the water phase comprises:

0.05–3 parts by weight of an alkali soap of fatty acids, and
45–98 parts by weight of water.

U.S. Pat. No. 4,312,767 (Adams et al., Jan. 26, 1982) relates to a lubricating oil composition containing a friction-modifying agent and an alkali metal borate antiwear agent that exhibits good antichatter characteristics and superior antiwear characteristics. The concentration of the friction-modifying agent will generally range from 0.05 to 10, preferably 0.2 to 5, weight percent of the final lubricating oil composition, while the concentration of the antiwear agent will range from 0.1 to 20 weight percent, preferably 0.5 to 5 weight percent.

U.S. Pat. No. 4,740,323 (Suzuki et al., Apr. 26, 1988) relates to a method of lubricating a working machine which comprises applying a lubricating oil composition to a sliding surface of the working machine and applying a dilution of the lubricating oil composition to a metal working section of the working machine, said composition comprising:

(A) 10 to 90% by weight of at least one oil selected from the group consisting of a mineral oil and a synthetic oil,
(B) 0 to 30% by weight of an extreme pressure additive and
(C) 10 to 60% by weight of an emulsifying agent, and having a coefficient of dynamic friction of less than 0.2

U.S. Pat. No. 4,770,803 (Forsberg, Sep. 13, 1988) provides for a composition comprising water and at least one carboxylic salt dispersed or dissolved in said water, said salt being derived from:

(A)(I) at least one hydrocarbyl-substituted carboxylic acid or anhydride, the hydrocarbyl substituent of said acid or anhydride having an average of from about 12 to about 500 carbon atoms, or (II) at least one derivative formed by reacting at least one of said hydrocarbyl-substituted carboxylic acid or anhydride with a reactant selected from the group consisting of (a) ammonia, (b) alcohol, (c) primary amine, (d) secondary amine, (e) hydroxyamine or (f) a combination of two or more of any of (a) through (e), the components of (f) being reacted with said hydroxy-substituted acid or anhydride simultaneously or sequentially in any order; and (B) at least one amine, alkali or alkaline earth metal, or alkali or alkaline earth metal component; with the proviso that:

(i) when component (A) is said hydrocarbyl-substituted carboxylic acid or anhydride, component (B) is other than an N-(hydroxy-substituted hydrocarbyl) amine and/or hydroxyl-substituted poly(hydrocarbyloxy) analog of said N-(hydroxyl-substituted hydrocarbyl) amine, component (B) is other than an N-(hydroxyl-substituted hydrocarbyl) amine and/or hydroxyl-substituted poly(hydrocarbyloxy) analog of said N-(hydroxyl-substituted hydrocarbyl) amine.

U.S. Pat. No. 4,822,507 (Kanamori et al., Apr. 18, 1989) relates to a lubricating oil composition serving as a sliding oil and a metal working oil which comprises;

(A) 5 to 88% by weight of at least one oil selected from the group consisting of a mineral oil and a synthetic oil,
(B) 2 to 50% by weight of a reaction product of a long chain dibasic acid and alkanolamine,
(C) 5 to 30% by weight of an extreme pressure additive and
(D) 5 to 30% by weight of an emulsifying agent.

U.S. Pat. No. 4,970,010 (Erickson et al., Nov. 13, 1990) encompasses lubricant additives comprising combinations of triglyceride vegetable oil with at least one of a sulfurized vegetable oil and a phosphite adduct of vegetable oil. The vegetable oil is a triglyceride in its native state with the fatty acids having from about 16 to about 26 carbon atoms and at least one double bond, but no more than three double bonds for at least 90% of the fatty acids. Preferably, the vegetable oil fatty acids are $C_{18-22}$ with the majority of fatty acids having one double bond. Most preferably, the vegetable oil is a meadowfoam oil, rapeseed oil or crambe oil.

U.S. Pat. No. 5,262,074 (Erickson et al., Nov. 16, 1993) provides a dry film lubricant having a wax component comprising a saturated component and an unsaturated component. The wax component is added to an aqueous miscible solvent for application to a metal surface. The saturated component comprises a saturated wax ester having a carbon chain length from about 28 to about 44 carbon atoms in length surrounding an ester bond. The unsaturated component comprises a phosphite adduct friction modifier and an unsaturated vegetable oil or modified unsaturated vegetable oil.

SUMMARY OF THE INVENTION

An oil-in-water emulsion composition is disclosed which comprises a mixture of water and (A) at least one oil comprising (1) a natural oil or synthetic triglyceride of the formula

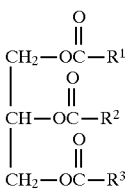

wherein $R^1$, $R^2$ and $R^3$ are independently saturated or unsaturated aliphatic groups that contain from about 7 to about 23 carbon atoms;

(2) a synthetic ester base oil comprising the reaction of a monocarboxylic acid of the formula $R^4COOH$ or a dicarboxylic acid of the formula

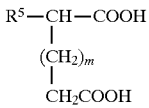

or an aryl carboxylic acid of the formula $R^6$—$Ar(COOH)_p$ wherein $R^4$ is a hydrocarbyl group containing from about 1 to about 23 carbon atoms, $R^5$ is hydrogen or a hydrocarbyl group containing from about 4 to about 50 carbon atoms, $R^6$ is hydrogen or a hydrocarbyl group containing from 1 up to about 24 carbon atoms, m is an integer of from 0 to about 8, and p is an integer of from 1 to 4; with an alcohol of the formula

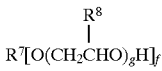

wherein $R^7$ is an aliphatic, alkoxy or hydroxyalkoxy group containing from 1 to about 30 carbon atoms or an aromatic group containing from 6 to about 18 carbon atoms, $R^8$ is hydrogen or an alkyl group containing 1 or 2 carbon atoms, g is from 0 to about 40 and f is from 1 to about 6;

(3) an olefin of the formula $R^9CH$=$CHR^{10}$ wherein $R^9$ is hydrogen or a straight chained alkyl group containing from 1 to 10 carbon atoms and $R^{10}$ is a branched or straight chained alkyl group containing from 1 to 10 carbon atoms, with the proviso that when $R^9$ is not hydrogen, the sum of the carbon atoms of $R^9$ and $R^{10}$ is at least 8; or (4) a polyolefin;

(B) at least one phosphite ester of the formula

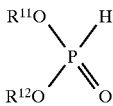

wherein $R^{11}$ and $R^{12}$ are independently aliphatic, aryl or aliphatic substituted aryl groups that independently contain from 6 to 30 carbon atoms; and (C) at least one emulsifier.

Also disclosed is a method of drilling a well borehole which encompasses using the biodegradable oil-in-water emulsion composition.

DETAILED DESCRIPTION OF THE INVENTION

The term "oil-in-water emulsion" refers to emulsions wherein the continuous phase is water and the discontinuous phase is oil and the components are soluble within the oil, the discontinuous oil phase being dispersed in the continuous water phase.

(A1) The Natural Oil or Synthetic Triglyceride

Typical oil based drilling fluids in which oil is the continuous phase are mineral oil based or hydrocarbon solvent based. Generally these fluids are both more expensive and harmful to the environment. Water based drilling fluids in which water is the continuous phase and that contain natural oils or synthetic triglycerides are both less expensive and also environmentally friendly in comparison to those drilling fluids that are mineral oil based or hydrocarbon solvent based.

In practicing this invention, employed is at least one natural oil or synthetic triglyceride of the formula

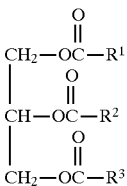

wherein $R^1$, $R^2$, and $R^3$ are independently saturated or unsaturated aliphatic hydrocarbyl groups that contain from about 7 to about 23 carbon atoms. The term "hydrocarbyl group" as used herein denotes a radical having a carbon atom directly attached to the remainder of the molecule. The aliphatic hydrocarbyl groups include the following:

(1) Aliphatic hydrocarbon groups; that is, alkyl groups such as heptyl, nonyl, decyl, undecyl, tridecyl, heptadecyl, octyl; alkenyl groups containing a single double bond such as heptenyl, nonenyl, undecenyl, tridecenyl, heptadecenyl, heneicosenyl; alkenyl groups containing 2 or 3 double bonds such as 8,11-heptadecadienyl and 8,11,14-heptadecatrienyl, and alkynyl groups containing the triple bonds. All isomers of these are included, but straight chain groups are preferred.

(2) Substituted aliphatic hydrocarbon groups; that is groups containing nonhydrocarbon substituents which, in the context of this invention, do not alter the predominantly hydrocarbon character of the group. Those skilled in the art will be aware of suitable substituents; examples are hydroxy, carbalkoxy, (especially lower carbalkoxy) and alkoxy (especially lower alkoxy), the term "lower" denoting groups containing not more than 7 carbon atoms.

(3) Hetero groups; that is, groups which, while having predominantly aliphatic hydrocarbon character within the context of this invention, contain atoms other than carbon present in a chain or ring otherwise composed of aliphatic carbon atoms. Suitable hetero atoms will be apparent to those skilled in the art and include, for example, oxygen, nitrogen and sulfur.

Naturally occurring triglycerides are vegetable oil triglycerides and animal fat triglycerides. The preferred vegetable oil triglycerides comprise sunflower oil, safflower oil, corn oil, soybean oil, rapeseed oil, meadowfoam oil, lesquerella oil, or castor oil. The preferred animal fat triglycerides comprise beef tallow, fish oil or lard oil. The synthetic triglycerides are those formed by the reaction of one mole of glycerol with three moles of a fatty acid or mixture of fatty acids. The fatty acids contain from about 6 to about 22 carbon atoms. The preferred fatty acids comprise octanoic acid, nonanoic acid, decanoic acid, lauric acid, myristic acid, palmitic acid, stearic acid, eicosanoic acid, triconanoic acid, oleic acid, linoleic acid, linolenic acid or ricinoleic acid.

In a preferred embodiment, the natural oil is a genetically modified vegetable oil. Within this embodiment, $R^1$, $R^2$, and $R^3$ are aliphatic groups that contain from 7 to about 23 carbon atoms and have a monounsaturated character of at least 60 percent, preferably at least 70 percent most preferably at least 80 percent. Naturally occurring triglycerides having utility in this invention are exemplified by vegetable oils that are genetically modified such that oil produced by the plants contain a higher than normal oleic acid content. Normal sunflower oil has an oleic acid content of 18–40 percent. By genetically modifying the sunflower plants, a sunflower oil can be obtained wherein the oleic content is from about 60 percent up to about 92 percent. That is, the $R^1$, $R^2$ and $R^3$ groups are heptadecenyl groups and the $R^1COO$—, $R^2COO$—, and $R^3COO$— that are attached to the 1,2,3-propanetriyl group —$CH_2CHCH_2$— are the residue of an oleic acid molecule. U.S. Pat. Nos. 4,627,192 and 4,743,402 are herein incorporated by reference for their disclosure to the preparation of high oleic sunflower oil.

Regardless of the source of the triglyceride oil, the fatty acid moieties are such that the triglyceride has a monounsaturated character of at least 60 percent, preferably at least 70 percent and most preferably at least 80 percent.

For example, a triglyceride comprised exclusively of an oleic acid moiety has an oleic acid content of 100% and consequently a monounsaturated content of 100%. Where the triglyceride is made up of acid moieties that are 70% oleic acid, 10% stearic acid, 13% palmitic acid, and 7% linoleic acid, the monounsaturated content is 70%. The preferred triglyceride oils are high oleic (at least 60 percent) acid triglyceride oils. Typical high oleic vegetable oils employed within the instant invention are high oleic safflower oil, high oleic corn oil, high oleic rapeseed oil, high oleic sunflower oil, high oleic cottonseed oil, high oleic canola oil, high oleic peanut oil, and high oleic soybean oil. A preferred high oleic vegetable oil is high oleic sunflower oil obtained from *Helianthus sp.* This product is available from SVO Enterprises, Eastlake, Ohio as Sunyl® high oleic sunflower oil. Sunyl 80 oil is a high oleic triglyceride wherein the acid moieties comprise about 80 percent oleic acid and Sunyl 90 oil is a high oleic triglyceride wherein the acid moieties comprise about 90 percent oleic acid. Another preferred high oleic vegetable oil is high oleic rapeseed oil obtained from *Brassica campestris* or *Brassica napus,* also available from SVO Enterprises. RS80 oil signifies a rapeseed oil wherein the acid moieties comprise about 80 percent oleic acid.

It is to be noted the olive oil is excluded as a genetically modified vegetable oil (A) in this invention. The oleic acid content of olive oil typically ranges from 65–85 percent. This content, however, is not achieved through genetic modifications, but rather is naturally occurring.

It is further to be noted that genetically modified vegetable oils have high oleic acid contents at the expense of the di- and tri-unsaturated acids. A normal sunflower oil has from 20–40 percent oleic acid moieties and from 50–70 percent linoleic acid moieties. This gives a 90 percent content of mono- and di-unsaturated acid moieties (20+70) or (40+50). Genetically modifying vegetable oils generate a low di- or tri-unsaturated moiety vegetable oil. The genetically modified oils of this invention have an oleic acid moiety:linoleic acid moiety ratio of from about 2 up to about 90. A 60 percent oleic acid moiety content and 30 percent linoleic acid moiety content of a triglyceride oil gives a ratio of 2. A triglyceride oil made up of an 80 percent oleic acid moiety and 10 percent linoleic acid moiety gives a ratio of 8. A triglyceride oil made up of a 90 percent oleic acid moiety and 1 percent linoleic acid moiety gives a ratio of 90. The ratio for normal sunflower oil is about 0.5 (30 percent oleic acid moiety and 60 percent linoleic acid moiety).

(A2) The Synthetic Ester Base Oil

The synthetic ester base oil comprises the reaction of a monocarboxylic acid of the formula

$$R^4COOH,$$

a dicarboxylic acid of the formula

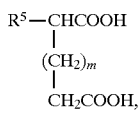

$$R^5-CHCOOH$$
$$|$$
$$(CH_2)_m$$
$$|$$
$$CH_2COOH,$$

or an aryl carboxylic acid of the formula

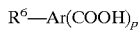

$$R^6-Ar(COOH)_p$$

wherein $R^4$ is a hydrocarbyl group containing from about 1 to about 23 carbon atoms, $R^5$ is hydrogen or a hydrocarbyl group containing from about 4 to about 50 carbon atoms, $R^6$ is hydrogen or a hydrocarbyl group containing from 1 up to about 24 carbon atoms, m is an integer of from 0 to about 8, and p is an integer of from 1 to 4; with an alcohol of the formula

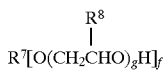

$$R^8$$
$$|$$
$$R^7[O(CH_2CHO)_gH]_f$$

wherein $R^7$ is an aliphatic alkoxy or hydroxy alkoxy group containing from 1 to about 30 carbon atoms or an aromatic group containing from 6 to about 18 carbon atoms, $R^8$ is hydrogen or an alkyl group containing 1 or 2 carbon atoms, g is from 0 to about 40 and f is from 1 to about 6.

Within the monocarboxylic acid, $R^4$ is an alkyl or alkenyl group. An illustrative but non-exhaustive list of monocarboxylic acids are the isomeric carboxylic acids of butanoic, hexanoic, octanoic, nonanoic, decanoic, undecanoic, dodecanoic, palmitic, stearic and oleic acids. Preferably $R^4$ contains from 9 to 19 carbon atoms and most preferably from 13 to 17 carbon atoms. A preferred monocarboxylic acid is oleic acid.

Within the dicarboxylic acid, when $R^5$ is hydrogen and m is an integer of from 1 to about 8. An illustrative but non-exhaustive list of dicarboxylic acids are succinic, glutaric, adipic, pimelic, suberic, azelaic, sebacic, and dodecanedioic acids. Preferably m is 8 and the dicarboxylic acid is dodecanedioic acid.

Within the dicarboxylic acid, when $R^5$ is a hydrocarbyl group, it is an alkyl group that contains from 12 to about 36 carbon atoms.

As aryl carboxylic acids, $R^6$ is hydrogen or an alkyl group that contains from about 1 to about 12 carbon atoms and p is 1 or 2. Aryl carboxylic acids having utility are benzoic, toluic, ethylbenzoic, phthalic, isophthalic, terephthalic, hemimellitic, trimellitic, trimeric, and pyromellitic acids.

Within the alcohols, $R^7$ preferably contains from about 1 to about 18 carbon atoms and g is from 0 to about 20. The alcohols may be monohydric, polyhydric or alkoxylated monohydric and polyhydric. Monohydric alcohols can comprise, for example, primary and secondary alcohols. The preferred monohydric alcohols, however are primary aliphatic alcohols, especially aliphatic hydrocarbon alcohols such as alkenols and alkanols. Examples of the preferred monohydric alcohols from which $R^7$ is derived include methanol, ethanol, 1-propanol, 1-butanol, 1-pentanol, 1-hexanol, 1-heptanol, 1-octanol, 1-decanol, 1-dodecanol, 1-tetradeconol, 1-hexadecanol, 1-octadecanol, oleyl alcohol, linoleyl alcohol, linolenyl alcohol, phytol, lauryl alcohol, myristyl alcohol, cetyl alcohol, stearyl alcohol, and behenyl alcohol. A most preferred monohydric alcohol is methanol.

Examples of polyhydric alcohols are those containing from 2 to about 6 hydroxy groups. They are illustrated, for example, by the alkylene glycols such as ethylene glycol, diethylene glycol, triethylene glycol, tetraethylene glycol, dipropylene glycol, tripropylene glycol, dibutylene glycol, tributylene glycol, and other alkylene glycols. A preferred class of alcohols suitable for use in this invention are those polyhydric alcohols containing up to about 12 carbon atoms. This class of alcohols includes glycerol, erythritol, trimethylolpropane (TMP), pentaerythritol, dipentaerythritol, gluconic acid, glyceraldehyde, glucose, arabinose, 1,7-heptanediol, 2,4-heptanediol, 1,2,3-hexanetriol, 1,2,4-hexanetriol, 1,2,5-hexanetriol, 2,3,4-hexanetriol, 1,2,3-butanetriol, 1,2,4-butanetriol, quinic acid, 2,2,6,6-tetrakis (hydroxymethyl) cyclohexanol, 1-10-decanediol, digitaloal, and the like.

Another preferred class of polyhydric alcohols for use in this invention are the polyhydric alcohols containing 3 to 10 carbon atoms and particularly those containing 3 to 6 carbon atoms and having at least three hydroxyl groups. Such alcohols are exemplified by glycerol, erythritol, pentaerythritol, mannitol, sorbitol, 2-hydroxymethyl-2-methyl-1,3,propanediol (trimethylolpropane), bis-trimethylolpropane, 1,2,4-hexanetriol and the like.

The alkoxylated alcohols may be alkoxylated monohydric alcohols or alkoxylated polyhydric alcohols. The alkoxy alcohols are generally produced by treating an alcohol with an excess of an alkylene oxide such as ethylene oxide or propylene oxide. For example, from about 6 to about 40 moles of ethylene oxide or propylene oxide may be condensed with an aliphatic alcohol.

In one embodiment, the aliphatic alcohol contains from about 14 to about 24 carbon atoms and may be derived from long chain fatty alcohols such as stearyl alcohol or oleyl alcohol.

The alkoxy alcohols useful in the reaction with the carboxylic acids to prepare synthetic esters are available commercially under such trade names as "TRITON®", "TERGITOL®" from Union Carbide, "ALFONIC®" from Vista Chemical, and "NEODOL®" from Shell Chemical Company. The TRITON® materials are identified generally as polyethoxylated alkyl phenols which may be derived from straight chain or branched chain alkyl phenols. The TERGITOLS® are identified as polyethylene glycol ethers of primary or secondary alcohols; the ALFONIC® materials are identified as ethyoxylated linear alcohols which may be represented by the general structure formula $$CH_3(CH_2)_xCH_2(OCH_2CH_2)_nOH$$

wherein x varies between 4 and 16 and n is a number between about 3 and 11. Specific examples of ALFONIC® ethoxylates characterized by the above formula include ALFONIC® 1012-60 wherein x is about 8 to 10 and n is an average of about 5.7; ALFONIC® 1214-70 wherein x is about 10–12 and n is an average of about 10.6; ALFONIC® 1412-60 wherein x is from 10–12 and n is an average of about 7; and ALFONIC® 1218-70 wherein x is about 10–16 and n is an average of about 10.7.

The NEODOL® ethoxylates are ethoxylated alcohols wherein the alcohols are a mixture of linear and branched alcohols containing from 9 to about 15 carbon atoms. The ethoxylates are obtained by reacting the alcohols with an excess of ethylene oxide such as from about 3 to about 12 or more moles of ethylene oxide per mole of alcohol. For example, NEODOL® ethoxylate 23–6.5 is a mixed linear and branched chain alcoholate of 12 to 13 carbon atoms with an average of about 6.5 ethoxy units.

As stated above, the synthetic ester base oil comprises reacting any above-identified acid or mixtures thereof with any above-identified alcohol or mixtures thereof at a ratio of 1 COOH per 1 OH group using esterification procedures, conditions and catalysts known in the art.

A non-exhaustive list of companies that produce synthetic esters and their trade names are BASF as Glissofluid, Ciba-Geigy as Reolube, JCI as Emkarote, Oleofina as Radialube and the Emery Group of Henkel Corporation as Emery.

(A3) The Olefin

When the olefin is the oil, the olefin is of the formula $$R^9CH=CHR^{10}$$

wherein $R^9$ is hydrogen or a straight chained alkyl group containing from 1 to 10 carbon atoms and $R^{10}$ is a branched or straight chained alkyl group containing from 1 to 10 carbon atoms, with the proviso that the sum of the carbon atoms of $R^9$ and $R^{10}$ is at least 8. Olefins having utility as oils are the primary olefins and those olefins where the double bond is internal. Such olefins are exemplified by the isomers of decene, undecene, dodecene, tridecene, tetradecene, pentadecene, hexadecene, heptadecene, octadecene, nonadecene, eicosene, heneicosene, and docosene.

(A4) The Polyolefin

The last oil having utility in this invention is a polyolefin. The polyolefin is characterized by the presence of at least one ethylenically unsaturated carbon-to-carbon covalent bond. Polyolefins are polymers that are derived from mono-olefins having from 2 to about 30 carbon atoms. Especially useful polymers are the polymers of 1-mono-olefins such as ethylene, propene, 1-butene, isobutene, 1-hexene, 1-octene, 2-methyl-1-heptene, 3-cyclohexyl-1-butene, and 2-methyl-5-propyl-1-hexene. Polymers of medial olefins, i.e., olefins in which the olefinic linkage is not at the terminal position, likewise are useful. These are exemplified by 2-butene, 3-pentene, and 4-octene.

(B) The Phosphite Ester

The phosphite ester is of the formula

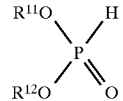

wherein $R^{11}$ and $R^{12}$ are independently aliphatic, aryl, aliphatic substituted aryl or aryl substituted aliphatic groups that contain from 6 to 30 carbon atoms. Preferably $R^{11}$ and $R^{12}$ are aliphatic groups that independently contain from 8 to 18 carbon atoms. An especially preferred phosphite ester is oleyl phosphite wherein $R^{11}$ and $R^{12}$ are both oleyl groups.

The $R^{11}$ and $R^{12}$ groups may comprise a mixture of alkyl groups derived from commercial alcohols. Examples of some preferred monohydric alcohols and alcohol mixtures include the commercially available "Alfol" alcohols marketed by Vista Chemical. Alfol 810 is a mixture containing alcohols consisting essentially of straight-chain, primary alcohols having 8 and 10 carbon atoms. Alfol 12 is a mixture comprising mostly $C_{12}$ fatty alcohols. Alfol 1218 is a mixture of synthetic, primary, straight-chain alcohols having 12 to 18 carbon atoms. The Alfol 20+ alcohols are mostly, on an alcohol basis, $C_{20}$ alcohols as determined by GLC (gas-liquid-chromatography). The Alfol 22+ alcohols are $C_{18-28}$ primary alcohols having mostly, on an alcohol basis, $C_{22}$ alcohols. These Alfol alcohols can contain a fairly large percentage (up to 40% by weight) of paraffinic compounds which can be removed before the reaction if desired.

Another example of a commercially available alcohol mixture is Adol 60 which comprises about 75% by weight of a straight-chain $C_{22}$ primary alcohol, about 15% of a $C_{20}$ primary alcohol and about 8% of $C_{18}$ and $C_{24}$ alcohols. Adol 320 comprises predominantly oleyl alcohol. The Adol alcohols are marketed by Sherex Corporation.

A variety of mixtures of monohydric fatty alcohols derived from naturally occurring triglycerides and ranging in chain length of from $C_8$ to $C_{18}$ are available from Procter & Gamble Company. These mixtures contain various amounts of fatty alcohols containing mainly 12, 14, 16, or 18 carbon atoms. For example, CO-1214 is a fatty alcohol mixture containing 0.5 of $C_{10}$ alcohol, 66.0% of $C_{12}$ alcohols, 26.0% of $C_{14}$ alcohol and 6.5% of $C_{16}$ alcohol.

Another group of commercially available mixtures include the "Neodol" products available from Shell Chemical Co. For example, Neodol 23 is a mixture of $C_{12}$ and $C_{13}$ alcohols; Neodol 25 is a mixture of $C_{12}$ and $C_{15}$ alcohols, Neodol 45 is a mixture of $C_{14}$ and $C_{15}$ alcohols. Neodol 91 is a mixture of $C_9$, $C_{10}$ and $C_{11}$ alcohols.

The dihydrocarbyl phosphites (B) useful in the present invention may be prepared by techniques well known in the art, and many dihydrocarbyl phosphites are available commercially. In one method of preparation, a lower molecular weight dialkylphosphite (e.g., dimethyl) is reacted with alcohols comprising a straight-chain alcohol, a branched-chain alcohol or mixtures thereof. As noted above, each of the two types of alcohols may themselves comprise mixtures. Thus, the straight-chain alcohol may comprise a mixture of straight-chain alcohols and the branched-chain alcohols may comprise a mixture of branched-chain alcohols. The higher molecular weight alcohols replace the methyl groups (analogous to classic transesterification) with the formation of methanol which is stripped from the reaction mixture.

In another embodiment, the branched chain hydrocarbyl group can be introduced into a dialkylphosphite by reacting the low molecular weight dialkylphosphite such as dimethylphosphite with a more sterically hindered branched-chain alcohol such as a neo alcohol (2,2,4-trimethyl-1-pentanol). In this reaction, one of the methyl groups is replaced by a neo group, and, apparently because of the size of the neo group, the second methyl group is not displaced by the neo alcohol.

The following examples illustrate the preparation of the phosphite esters (B) which are useful in the compositions of the present invention. Unless otherwise indicated in the following examples and elsewhere in the specification and claims, all parts and percentages are by weight, and all temperatures are in degrees centigrade.

EXAMPLE (B)-1

A mixture of 911.4 parts (7 moles) of 2-ethylhexanol, 1022 parts (7 moles) of Alfol 8-10, and 777.7 parts (7 moles) of dimethylphosphite is prepared and heated to 125° C. while sparging with nitrogen and removing methanol as a distillate. After about 6 hours, the mixture was heated to 145° C. and maintained at this temperature for an additional 6 hours whereupon about 406 parts of distillate are recovered. The reaction mixture is stripped to 150° C. at 50 mm. Hg., and an additional 40 parts of distillate are recovered. The residue is filtered through a filter aid and the filtrate is the desired mixed dialkyl hydrogen phosphite containing 9.6% phosphorus (theory, 9.7%).

EXAMPLE (B)-2

A mixture of 468.7 parts (3.6 moles) of 2-ethylhexanol, 1050.8 parts (7.20 moles) of Alfol 8-10, and 600 parts (5.4 moles) of dimethylphosphite is prepared and heated to 135° C. while purging with nitrogen. The mixture is heated slowly to 145° C. and maintained at this temperature for about 6 hours whereupon a total of 183.4 parts of distillate are recovered. The residue is vacuum stripped to 145° C. (10 mm. Hg.) and 146.3 parts of additional distillate are recovered. The residue is filtered through a filter aid, and the filtrate is the desired product containing 9.3% phosphorus (theory, 9.45%).

(C) The Emulsifier

Three different types of emulsifiers are envisioned in perfecting this invention. The first emulsifier (C1) is the reaction of a carboxylic acid acylating agent and an alkanol amine, the second emulsifier (C2) is the reaction product of a carboxylic acylating agent and an alcohol and the third emulsifier (C3) relates to a coupled polyolefin salt wherein the carboxylic acylating agents are coupled with a bridging compound and the coupled carboxylic acylating agents are reacted with an amine. Any of the emulsifiers may be prepared using mineral oil as a diluent as a means of fluidizing the emulsifier. Either a portion of the mineral oil or all of the mineral oil can be replaced with component (A).

The first emulsifier is the reaction product of (a) at least one carboxylic acid acylating agent of the formula

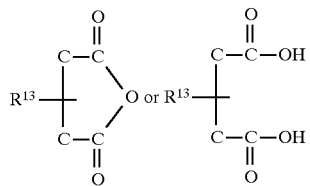

with (b) at least one alkanol amine, said acylating agent (a) having at least one hydrocarbyl group $R^{13}$ of about 20 to about 500 and preferably of about 50 to about 300 carbon atoms and said alkanol amine (b) having one hydroxyl group and a total of up to about 12 carbon atoms.

The individual reactants (a) and (b) and the reaction of (a) and (b) will now be discussed in detail in order to provide a disclosure of a representative number of examples of each. U.S. Pat. No. 4,435,297 is incorporated herein by reference for purposes of disclosing examples of reactants (a) and (b), the reaction between (a) and (b) and the resulting reaction product.

The acylating agents (a) used in making the first emulsifier are well known to those skilled in the art. See, for example, the following U.S. patents which are hereby incorporated by reference for their disclosures relating to the preparation of carboxylic acid acylating agents: U.S. Pat. Nos. 3,219,666; 3,272,746; 3,381,102; 3,254,025; 3,278,550; 3,288,714; 3,271,310; 3,373,111; 3,346,354; 3,272,743; 3,374,174; 3,307,928; and 3,394,179.

Generally, these carboxylic acid acylating agents are prepared by reacting an olefin polymer or chlorinated analog thereof with an unsaturated carboxylic acid or derivative thereof such as acrylic acid, fumaric acid, maleic anhydride and the like. Typically, these acylating agents are polycarboxylic acylating agents such as the succinic acid acylating agents derived from maleic acid, its isomers, anhydride and chloro and bromo derivatives. A dicarboxylic acid in the form of a succinic acid derivative is the preferred acylating agent (a).

These acylating agents have at least one hydrocarbyl-based substituent of about 20 to about 500 carbon atoms. Generally, this substituent has an average of at least about 30, and often at least about 50 carbon atoms. Typically, this substituent has a maximum average of about 300, and often about 200 carbon atoms. As used herein, the term "hydrocarbon-based", "hydrocarbon-based substituent"; "hydrocarbon radical" and the like denotes the substituent having a carbon atom directly attached to the remainder of the molecule (i.e., the carboxylic acylating portion) and having predominantly hydrocarbyl character within the context of this invention.

Examples of substituents which might be useful in connection with the present invention include the following:

(1) hydrocarbon substituents, that is, aliphatic (e.g., alkyl or alkenyl), alicyclic (e.g., cycloalkyl, cycloalkenyl) substituents, aromatic, aliphatic and alicyclic-substituted aromatic nuclei and the like as well as cyclic substituents wherein the ring is completed through another portion of the molecule (that is, for example, any two indicated substituents may together form an alicyclic radical);

(2) substituted hydrocarbon substituents, that is, those substituents containing nonhydrocarbon radicals which, in the context of this invention, do not alter the predominantly hydrocarbon substituent; those skilled in the art will be aware of such radicals (e.g., halo (especially chloro and fluoro), hydroxy, alkoxy, mercapto, alkylmercapto, nitro, nitroso, sulfonyl sulfoxy, etc.);

(3) hetero substituents, that is, substituents which will, while having predominantly hydrocarbyl character within the context of this invention, contain other than carbon present in a ring or chain otherwise composed of carbon atoms. Suitable heteroatoms will be apparent to those of skill in the art and include, for example, sulfur, oxygen, nitrogen and such substituents as, e.g., pyridyl, furanyl, thiophenyl, imidazolyl, etc., are exemplary of these hetero substituents.

In general, no more than about three radicals or heteroatoms and preferably no more than one, will be present for each ten carbon atoms in the hydrocarbon-based substituents. Typically, there will be no such radicals or heteroatoms in the hydrocarbon-based substituent and it will, therefore, be purely hydrocarbon.

In general, the hydrocarbon-based substituents of at least 20 carbon atoms present in the acylating agents used in this invention are free from acetylenic unsaturation; ethylenic unsaturation, when present will generally be such that there is not more than one ethylenic linkage present for every ten carbon-to-carbon bonds in the substituent. The substituents may be completely saturated or contain ethylenic unsaturation.

As noted above, the hydrocarbon-based substituents present in the acylating agents of this invention are derived from olefin polymers or chlorinated analogs thereof. The olefin monomers from which the olefin polymers are derived are polymerizable olefins and monomers characterized by having one or more ethylenic unsaturated group. They can be monoolefinic monomers such as ethylene, propylene, butene-1, isobutene and octene-1 or polyolefinic monomers (usually diolefinic monomers such as butadiene-1,3 and isoprene). Usually these monomers are terminal olefins, that is, olefins characterized by the presence of the group

>C=CH$_2$

However, certain internal olefins can also service as monomers (these are sometimes referred to as medial olefins). When such olefin monomers are used, they normally are employed in combination with terminal olefins to produce olefin polymers which are interpolymers. Although the hydrocarbyl-based substituents may also include aromatic groups (especially phenyl groups and lower alkyl and/or lower alkoxy-substituted phenyl groups such as para(tertiary butyl)phenyl groups) and alicyclic groups such as would be obtained from polymerizable cyclic olefins or alicyclic-substituted polymerizable cyclic olefins. The olefin polymers are usually free from such groups. Nevertheless, olefin polymers derived from such interpolymers of both 1,3-dienes and styrenes such as butadiene-1,3 and styrene or para(tertiary butyl)styrene are exceptions to this general rule.

Generally the olefin polymers are homo- or interpolymers of terminal hydrocarbyl olefins of about 2 to about 16 carbon atoms. A more typical class of olefin polymers is selected from that group consisting of homo- and interpolymers of terminal olefins to two to six carbon atoms, especially those of two to four carbon atoms.

Specific examples of terminal and medial olefin monomers which can be used to prepare the olefin polymers from which the hydrocarbon based substituents in the acylating agents used in this invention are ethylene, propylene, butene-1, butene-2, isobutene, pentene-1, hexene-1, heptene-1, octene-1, nonene-1, decene-1, pentene-2, propylene tetramer, diisobutylene, isobutylene trimer, butadiene-1,2 butadiene-1,3 pentadiene-1,2 pentadiene-1,3, isoprene, hexadiene-1,5, 2-chlorobutadiene-1,3, 2-methylheptene-1, 3-cyclohexylbutene-1, 3,3-dimethylpentene-1, styrenedivinylbenzene, vinylacetate, allyl alcohol, 1-methylvinylacetate, acrylonitrile, ethylacrylate, ethylvinylether and methylvinylketone. Of these, the purely hydrocarbyl monomers are more typical and the terminal olefin monomers are especially typical.

Often the olefin polymers are poly(isobutene)s. As indicated above, polyisobutenyl substituents are preferably in connection with the present invention. These polyisobutenyl polymers may be obtained by polymerization of a C$_4$ refinery stream having a butene content of about 35 to about 75 percent by weight and an isobutene content of about 30 to about 60 percent by weight in the presence of a Lewis acid catalyst such as aluminum chloride or boron trifluoride. These poly(isobutene)s contain predominantly (that is, greater than 80% of the total repeat units) isobutene repeat units of the configuration

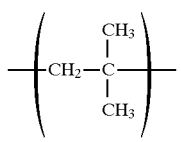

Typically, the hydrocarbyl-based substituent in the carboxylic acid acylating agent as used in the present invention is a hydrocarbyl, alkyl or alkenyl group of about 30, often about 50, to about 500, sometimes about 300, carbon atoms. For convenience herein, such substituents are represented by the indicia "hyd".

As noted above, typical acylating agents (a) used in making the emulsifiers of this invention are substituted succinic acids or derivatives thereof. In this case, the preferred acylating agent (a) can be represented by the formulae:

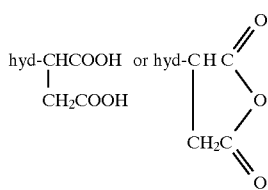

Such succinic acid acylating agents can be made by the reaction of maleic anhydride, maleic acid, or fumaric acid with the afore-described olefin polymer, as is shown in the patents referred to above. Generally, the reaction involves merely heating the two reactants at a temperature of about 150° C. to about 200° C., or by reacting the olefin polymer with chlorine at a temperature of from 75° C.–125° C. and then further reacting with maleic anhydride, maleic acid or fumaric acid at a temperature of from 100° C.–200° C. Mixtures of these polymeric olefins, as well as mixtures of these unsaturated mono- and polycarboxylic acids can also be used.

The alkanol amines (b) used in making the first emulsifier have one hydroxyl group per molecule and normally up to about 40 carbon atoms. These hydroxyl groups are bonded to an alkyl group which in turn is bonded to the amine portion of the molecule. The two remaining substituents bonded to the amine nitrogen are either both hydrogens, one hydrogen and one hydrocarbyl group or two hydrocarbyl groups wherein the hydrocarbyl groups have one to about 20 carbon atoms. Usually the hydrocarbyl groups will also be alkyl groups, but they can be alkenyl groups with one olefinic bond. Typically they are lower alkyl groups of up to seven carbons, though they can also be aryl, aralkyl, alkaryl, cycloalkyl, alkyl cycloalkyl, and cycloalkylalkyl groups. Mixtures of two or more of the amines (b) can also be used.

A typical class of useful amines can be represented by the formula:

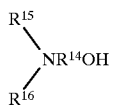

wherein each $R^{15}$ and $R^{16}$ are independently hydrogen or an alkyl group of one to about 4 carbon atoms or mixtures thereof and $R^{14}$ is a straight or branched chain alkylene group of about 2 to about 4 carbon atoms. The alkanolamines can be primary, secondary or tertiary alkanolamines and tertiary alkanol amines are preferred, especially those wherein each of $R^{15}$ and $R^{16}$ is independently a lower alkyl and $R^{14}$ is lower alkylene. The $R^{15}$ and $R^{16}$ groups can be joined by a carbon-to-carbon bond. The most preferred alkanol amine (b) is N,N-diethyl ethanol amine and N,N-dimethyl-2-hydroxybutyl amine.

Now that a disclosure has been given with respect to both (a) and (b), a general description will be given of the reaction of (a) and (b). An extremely large number of reaction products are possible.

The reaction of acylating agent (a) with the alkanol amine (b) can be carried out at a temperature ranging from about 30° C. to the decomposition temperature of one or more of the reaction components and/or products. Typically, it is carried out at a temperature in the range of about 50° C. to about 150° C. The reaction is preferably carried out under ester-forming conditions and the product thus formed is either an amidic acid, amidic salt or an ester/salt. The ester/salt is either an internal salt involving residues of a molecule of acylating agent and an amine, wherein one of the carboxyl groups becomes ionically bound to a nitrogen atom within the same group or an external salt wherein the ionic salt group is formed with a nitrogen atom which is not part of the same molecule.

Mixtures of acylating agents (a) and/or mixtures of alkanol amines (b) can be used. Generally, the equivalent ratio of acylating agent to alkanol amine formed is in the range of about 0.5 to about 3 equivalents of amine per equivalent of carboxylic acylating agent. An equivalent of carboxylic acylating agent can be determined by dividing the molecular weight of the acylating agent by the number of carboxyl functions. This can usually be determined from the structural formula of the acylating agent or empirically through well-known titration procedures. Thus a succinic anhydride has an equivalent weight of half its molecular weight. An equivalent of alkanol amine is equal to its molecular weight. Preferred equivalent ratios of acylating agent (a) to amine (b) is in the range of about 1:1 to about 1:2.5.

Usually the agent (a) and amine (b) are reacted at a temperature below about 100° C., often in the absence of additional solvent/diluents.

The following are specific examples of the preparation of the first emulsifier. In these examples all parts and percentages are by weight unless expressly stated to the contrary and all temperatures are in degrees Celsius, as in the case throughout the specification and appended claims.

EXAMPLE (C1)-1

To a charge of 2,240 parts of a poly(isobutene)-substituted succinic anhydride (having a molecular weight of 1,120) heated in a resin kettle with stirring to about 90° slowly add over a two-hour period 468 parts of diethyl ethanol amine. Continue heating for an additional hour at about 90°. The desired reaction product is a viscous, clear, brown-tinted liquid at room temperature.

EXAMPLE (C1)-2

To a charge of 6,720 parts of the succinic anhydride described in Example C-1, heated to 90° with stirring, slowly add over 1.5 hours 702 parts of diethyl ethanol amine. Heat this intermediate mixture for an additional 0.5 hour at 90°. Then slowly add 366 parts of monoethanol amine. Hold the mixture at 90° for a final 0.5 hour and cool to provide a clear brown, viscous liquid product.

The second emulsifier (C2) is formed by the reaction of (a) 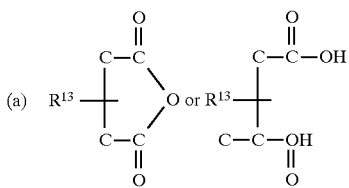

with $$R^{17}(OH)_q \quad (c)$$

wherein $R^{13}$ is a hydrocarbyl group as defined in the first emulsifier, $R^{17}$ is a hydrocarbyl group containing from about 2 to about 40 carbon atoms and q is an integer of from 2 to about 10.

The second emulsifier is made by the reaction of (a) at least one carboxylic acid acylating agent, as defined above within the first emulsifier, and (c) an alcohol $R^{17}(OH)_q$. Within the alcohol $R^{17}$ is a hydrocarbyl group containing from about 2 to about 40 carbon atoms and m is an integer of from 2 to about 10.

The structure of the second emulsifier is a function of the equivalents ratio of (a):(c) and also the value of the subscript q of (c). The higher the value of q in conjunction with the higher the equivalent ratio of (a):(c), the greater the degree of cross-linking within the second emulsifier.

A discussion of the equivalent weight of (a) appears within the disclosure of the first emulsifier. An equivalent weight of alcohol (c) is its molecular weight divided by the total number of hydroxyl groups present within the molecule (q). Thus an equivalent weight of ethylene glycol is one-half its molecular weight.

The alcohols useful as component (c) include those compounds of the general formula $$R^7(OH)_q$$

wherein $R^{17}$ is a hydrocarbyl group comprising a monovalent or polyvalent organic group joined to the —OH groups through carbon-to-oxygen bonds (that is, —COH wherein the carbon is not part of a carbonyl group) and q is an integer of from 2 to about 10, preferably 2 to about 6. These alcohols can be aliphatic, cycloaliphatic, aromatic, and heterocyclic, including aliphatic-substituted cycloaliphatic alcohols, aliphatic-substituted aromatic alcohols, aliphatic-substituted heterocyclic alcohols, cycloaliphatic-substituted aliphatic alcohols, cycloaliphatic-substituted heterocyclic alcohols, heterocyclic-substituted aliphatic alcohols, heterocyclic-substituted cycloaliphatic alcohols, and heterocyclic-substituted aromatic alcohols. The polyhydric alcohols corresponding to the formula $R^{17}(OH)_q$ preferably contain not more than about 40 carbon atoms, more preferably not more than about 20 carbon atoms. The alcohols may contain non-hydrocarbon substituents or groups which do not interfere with the reaction of the alcohols with the hydrocarbyl-substituted carboxylic acids or anhydrides of this invention. Such non-hydrocarbon substituents or groups include lower alkoxy, lower alkyl, mercapto, nitro, and interrupting groups such as —O— and —S— (e.g., as in such groups as —CH$_2$CH$_2$—XCH$_2$CH$_2$ where X is —O— or —S—).

Alcohols useful in this invention also include alkylene glycols and polyoxyalkylene alcohols such as polyoxyethylene alcohols, polyoxypropylene alcohols, polyoxybutylene alcohols, and the like. These polyoxyalkylene alcohols (sometimes called polyglycols) can contain up to about 150 oxyalkylene groups, with the alkylene group containing from about 2 to about 8 carbon atoms. Such polyoxyalkylene alcohols are generally dihydric alcohols. That is, each end of the molecule terminates with an OH group. In order for such polyoxyalkylene alcohols to be useful, there must be at least two OH groups.

The polyhydric alcohols useful in this invention include polyhydroxy aromatic compounds. Polyhydric phenols and naphthols are useful hydroxyaromatic compounds. These hydroxy-substituted aromatic compounds may contain other substituents in addition to the hydroxy substituents such as halo, alkyl, alkenyl, alkoxy, alkylmercapto, nitro and the like. Usually, the hydroxy aromatic compound will contain from 2 to about 4 hydroxy groups. The aromatic hydroxy compounds are illustrated by the following specific examples: resorcinol, catechol, p,p'-dihydroxy-biphenyl, hydroquinone, pyrogallol, phloroglycinol, hexylresorcinol, orcinol, etc.

The polyhydric alcohols preferably contain from 2 to about 10 hydroxy groups. They are illustrated, for example, by the alkylene glycols and polyoxyalkylene glycols mentioned above such as ethylene glycol, diethylene glycol, triethylene glycol, tetraethylene glycol, dipropylene glycol, tripropylene glycol, dibutylene glycol, tributylene glycol, and other alkylene glycols and polyoxyalkylene glycols in which the alkylene groups contain from 2 to about 8 carbon atoms preferred in ethylene glycol.

Other useful polyhydric alcohols include glycerol, monooleate of glycerol, monostearate of glycerol, monomethyl ether of glycerol, pentaerythritol, n-butyl ester of 9,10-dihydroxy stearic acid, methyl ester of 9,10-dihydroxy stearic acid, 1,2-butanediol, 2,3-hexanediol, 2,4-hexanediol, pinacol, erythritol, arabitol, sorbitol, mannitol, 1,2-cyclohexanediol, and xylene glycol. Carbohydrates such as sugars, starches, celluloses, and so forth likewise can be used. The carbohydrates may be exemplified by glucose, fructose, sucrose, rhamnose, mannose, glyceraldehyde, and galactose.

Useful alcohols also include those polyhydric alcohols containing up to about 12 carbon atoms, and especially those containing from about 3 to about 10 carbon atoms. This class of alcohols includes glycerol, erythritol, pentaerythritol, dipentaerythritol, glyconic acid, glyceraldehyde, glucose, arabinose, 1,7-heptanediol, 2,4-heptanediol, 1,2,3-hexanetriol, 1,2,4-hexanetriol, 1,2,5-hexanetriol, 2,3,4-hexanetriol, 1,2,3-butanetriol, 1,2,4-butanetriol, quinic acid, 2,2,6,6-tetrakis(hydroxymethyl)cyclohexanol, 1,10-decanediol, digitalose, and the like. Aliphatic alcohols containing at least about 3 hydroxyl groups and up to about 10 carbon atoms are useful.

Useful polyhydric alcohols are the polyhydric alkanols containing from about 3 to about 10 carbon atoms and particularly, those containing about 3 to about 6 carbon atoms and having at least three hydroxyl groups. Such alcohols are exemplified by glycerol, erythritol, pentaerythritol, mannitol, sorbitol, 2-hydroxymethyl-2-methyl-1,3-propanediol-(trimethylolethane), 2-hydroxymethyl-2-ethyl 1,3-propanediol (trimethylpropane), 1,2,4-hexanetriol, and the like.

The second emulsifier may be prepared by one of several methods. The method which is preferred because of convenience and superior properties of the emulsifier it produces, involves the reaction of a suitable alcohol with a substantially hydrocarbon-substituted succinic anhydride. Esterification is usually carried out at a temperature above about 100° C., preferably between 150° C. and 300° C.

The water formed as a by-product is removed by distillation as the esterification proceeds. A solvent may be used in the esterification to facilitate mixing and temperature control. It also facilitates the removal of water from the reaction mixture. The useful solvents include xylene, toluene, diphenyl ether, chlorobenzene, and mineral oil. The esterification is illustrated by the reaction of ethylene glycol with a substituted succinic anhydride as represented by the equations below.

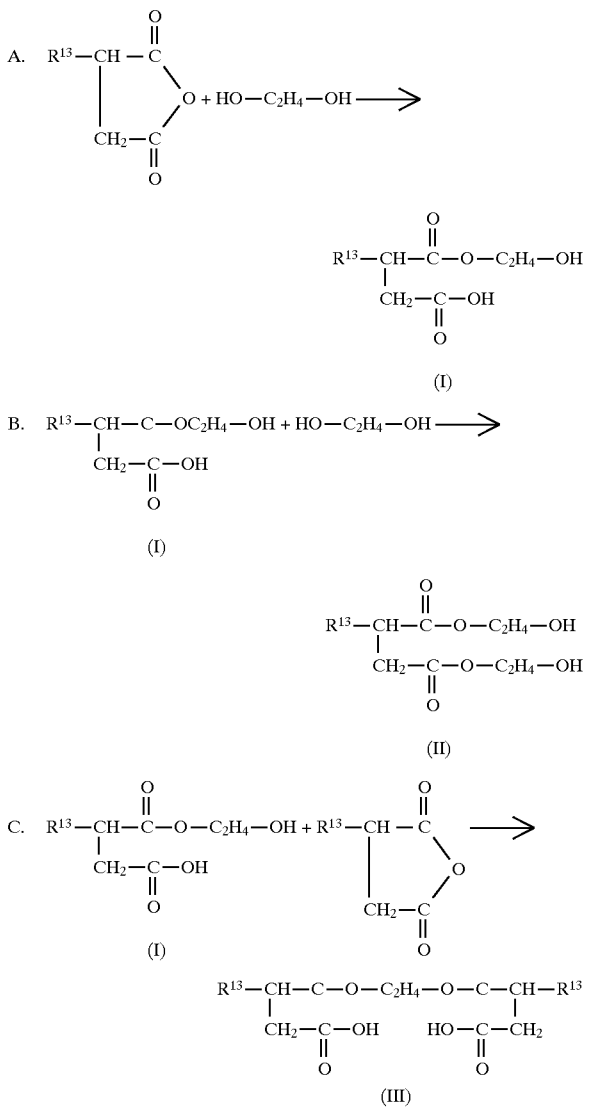

wherein $R^{13}$ is a hydrocarbyl group as defined in the first emulsifier. It will be readily appreciated that the above equations are merely illustrative. Other products not represented by Formulas I, II and III may be formed. Polymeric esters formed by the condensation of two or more molecules of each of the succinic acid reactant and the polyhydric alcohol reactant likewise may be formed. In most cases the product is a mixture of esters, the precise chemical composition and the relative proportions of which in the product are difficult to determine. Consequently, the product of such reaction is best described in terms of the process by which it is formed.

A modification of the above process involves the replacement of the substituted succinic anhydride with the corresponding succinic acid. However, succinic acids readily undergo dehydration at temperatures above about 100° C. and are thus converted to their anhydrides which are then esterified by the reaction with the alcohol reactant. In this regard, succinic acids appear to be the substantial equivalent of their anhydrides in the process.

The relative proportions of the succinic reactant and the hydroxy reactant which are to be used depend to a large measure upon the type of product desired and the number of hydroxyl groups present in the molecule of the hydroxy reactant. For instance, the formation of a half ester of a succinic acid, i.e., one in which only one of the two acid radicals is esterified, involves the use of one mole of a monohydric alcohol for each mole of the substituted succinic acid reactant, whereas the formation of a diester of a succinic acid involves the use of two moles of the alcohol for each mole of the acid. On the other hand, one mole of a hexahydric alcohol may combine with as many as six moles of a succinic acid to form an ester in which each of the six hydroxyl radicals of the alcohol is esterified with one of the two acid radicals of the succinic acid. Thus, the maximum proportion of the succinic acid to be used with a polyhydric alcohol is determined by the number of hydroxyl groups present in the molecule of the hydroxy reactant. For the purposes of this invention, it has been found that esters obtained by the reaction of equi-molar amounts of the succinic acid reactant and hydroxy reactant have superior properties and are therefore preferred.

In some instances it is advantageous to carry out the esterification in the presence of a catalyst such as sulfuric acid, pyridine hydrochloride, hydrochloric acid, benzene sulfonic acid, p-toluene sulfonic acid, phosphoric acid, or any other known esterification catalyst. The amount of the catalyst in the reaction may be as little as 0.01% (by weight of the reaction mixture), more often from about 0.1% to about 5%.

The following examples illustrate the preparation of the second emulsifiers.

EXAMPLE (C2)-1

A substantially hydrocarbon-substituted succinic anhydride is prepared by chlorinating a polyisobutene having a molecular weight of 1000 to a chlorine content of 4.5% and then heating the chlorinated polyisobutene with 1.2 molar proportions of maleic anhydride at a temperature of 150°–220° C. The succinic anhydride thus obtained has an acid number of 130. A mixture of 874 grams (1 mole) of the succinic anhydride and 104 grams (1 mole) of neopentyl glycol is mixed at 240° C.–250° C./30mm. for 12 hours. The residue is a mixture of the esters resulting from the esterification of one and both hydroxy radicals of the glycol. It has a saponification number of 101 and an alcoholic hydroxyl content of 0.2%.

EXAMPLE (C2)-2

A mixture of 926 grams of a polyisobutene-substituted succinic anhydride having an acid number of 121, 1023 grams of mineral oil, and 124 grams (2 moles per mole of the anhydride) of ethylene glycol is heated at 50°–170° C. while hydrogen chloride is bubbled through the reaction mixture for 1.5 hours. The mixture is then heated to 250° C./30 mm. and the residue is purified by washing with aqueous sodium hydroxide followed by washing with water, then dried and filtered. The filtrate is 50% oil solution of an ester having a saponification number of 48.

EXAMPLE (C2)-3

A mixture of 438 grams of the polyisobutene-substituted succinic anhydride prepared as is described in Example (C2)-1 and 333 grams of a commercial polybutylene glycol having a molecular weight of 1000 is heated for 10 hours at 150°–160° C. The residue is an ester having a saponification number of 73 and an alcoholic hydroxyl content of 0.7%.

EXAMPLE (C2)-4

A mixture of 456 grams of a polyisobutene-substituted succinic anhydride prepared as is described in Example (C2)-1 and 350 grams (0.35 mole) of the monophenyl ether of a polyethylene glycol having a molecular weight of 1000 is heated at 150°–155° C. for 2 hours. The product is an ester having a saponification number of 71, an acid number of 53, and an alcoholic hydroxyl content of 0.52%.

The third emulsifier (C3) comprises the coupling of two different acylating agents. A high molecular weight acylating agent and a low molecular weight acylating agent are coupled together to form an intermediate. The intermediate is reacted with an amine to form the desired emulsifier.

The high molecular weight acylating agent (a) is of the formula

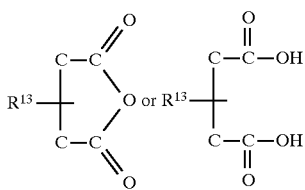

This acylating agent (a) is defined above with the first and second emulsifiers.

The high molecular weight acylating agent (a) is coupled with a low molecular weight acylating agent (d) of the formula

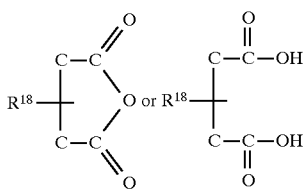

wherein $R^{18}$ is a hydrocarbyl group that contains from 1 up to 18 carbon atoms. Preferably $R^{18}$ is an aliphatic or alicyclic hydrocarbyl group with less than 10% of its carbon-to-carbon bonds being unsaturated. $R^{18}$ can be derived from olefins of from 2 to about 18 carbon atoms with alpha-olefins being particularly useful. Examples of such olefins include ethylene, propylene, 1-butene, isobutene, 1-pentene, 2-methyl-1-butene, 3-methyl-1-butene, 1-hexene, 1-heptene, 1-octane, styrene, 1-nonene, 1-decene, 1-undecene, 1-dodecene, 1-tridecene, 1-tetradecene, 1-pentadecene, 1-hexadecene, 1-heptadecene, 1-octadecene, etc. Commercially available alpha olefin fractions such as $C_{15-18}$ alpha olefins, $C_{12-16}$ alpha olefins, $C_{14-16}$ alpha olefins, $C_{14-18}$ alpha olefins, $C_{16-18}$ alpha olefins, etc. are particularly useful; these commercial alpha olefin fractions also usually include minor amounts of alpha olefins outside the given ranges. The production of such substituted succinic acids and their derivatives is well known to those of skill in the art and need not be discussed in detail herein.

Coupling Components

The coupling component (e) acts as a bridge between the low and the high molecular weight succinic acid molecules. The low and high molecular weight molecules may be mixed together, and are reacted with the coupling component. All possible linked products are formed, that is, the product in which a coupling, or bridging component acts as a bridge between a low and a high molecular weight species, the product in which a coupling components as a bridge between two low molecular weight succinic agents and the product in which a coupling component acts as a bridge between two high molecular weight succinic agents. The coupling component may be any compound having (i) two or more primary amino groups, (ii) two or more secondary amino groups, (iii) at least one primary amino group and at least one secondary group, (iv) at least two hydroxyl groups, or (v) at least one primary or secondary amino group and at least one hydroxyl group. These include the polyamines, polyols and hydroxyamines disclosed above as co-reactants.

Polyamines Useful as Coupling Components

The polyamines useful as coupling compounds are characterized by the presence within their structure of at least two —$NH_2$ groups, at least two >NH groups, or at least one —$NH_2$ group and at least one >NH group.

These polyamines may be aliphatic, cycloaliphatic, aromatic or heterocyclic, including aliphatic-substituted aromatic, aliphatic-substituted cycloaliphatic, aliphatic-substituted heterocyclic, cycloaliphatic-substituted aliphatic, cycloaliphatic-substituted aromatic, cycloaliphatic-substituted heterocyclic, aromatic substituted aliphatic, aromatic-substituted cycloaliphatic, aromatic-substituted heterocyclic, heterocyclic-substituted aliphatic, heterocyclic-substituted cycloaliphatic and heterocyclic-substituted aromatic amines. These amines may be saturated or unsaturated. The amines may also contain non-hydrocarbon substituents or groups as long as these groups do not significantly interfere with the reaction of such amines with the high molecular weight and low molecular weight acylating agents. Such non-hydrocarbon substituents or groups include lower alkoxy, lower alkyl, mercapto, nitro, and interrupting groups such as —O— and —S— (e.g., as in such groups as

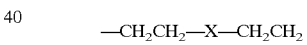

where X is —O— or —S—).

The polyamines include aliphatic, cycloaliphatic and aromatic polyamines analogous to the aliphatic, cycloaliphatic and aromatic monoamines described below except for the presence within their structure of at least one additional >NH or —$NH_2$ group. Suitable polyamines may be readily selected, by those skilled in the art from the poly-amine co-reactants discussed above.

Polyols Useful as Coupling Components

The polyols or polyhydric alcohols useful as coupling components include those polyols disclosed above as $R^9(OH)_m$ for use in preparing the second emulsifier. Alkylene glycols, polyoxyalkylene glycols, are particularly useful.

Hydroxyamines Useful as Coupling Components

The hydroxyamines useful as coupling molecules may be primary or secondary amines. They may also be tertiary amines provided said tertiary amines also contain at least two hydroxyl groups. These hydroxyamines contain at least two >NH, at least two $NH_2$ groups, at least one —OH group and at least one >NH or —$NH_2$ group, or at least two —OH groups. The terms "hydroxyamine" and "aminoalcohol" describe the same class of compounds and, therefore, may be used interchangeably. Such hydroxyamines may be readily selected, by those skilled in the art from the alkanol amines disclosed in preparing the first emulsifier.

After the intermediate is formed, the third emulsifier is formed by reacting the intermediate with an amine (f). The amines that function as (f) include ammonia, and the primary amines, secondary amines and hydroxyamines discussed above as being useful as the coupling component (e). In addition to ammonia, the primary amines, secondary amines and hydroxyamines discussed above, the amines (f) also include primary and secondary monoamines, and tertiary mono- and polyamines. The primary and secondary monoamines are described above under the subtitle "Polyamines Useful as Coupling Molecules" as being analogues of the polyamines described above. These primary and secondary monoamines include the aliphatic, cycloaliphatic and aromatic monoamines discussed above. The tertiary amines are analogous to the primary amines, secondary amines and hydroxyamines discussed above with the exception that they can be either monoamines or polyamines and the hydrogen atoms in the H—N< or —NH$_2$ groups are replaced by hydrocarbyl groups.

The tertiary amines can be aliphatic, cycloaliphatic, aromatic or heterocyclic, including aliphatic-substituted aromatic, aliphatic-substituted cycloaliphatic, aliphatic-substituted heterocyclic, cycloaliphatic-substituted aliphatic, cycloaliphatic substituted aromatic, cycloaliphatic-substituted heterocyclic, aromatic-substituted aliphatic, aromatic-substituted cycloaliphatic, aromatic-substituted heterocyclic, heterocyclic-substituted aliphatic, heterocyclic-substituted cycloaliphatic and heterocyclic-substituted aromatic amines. These tertiary amines may be saturated or unsaturated. If unsaturated, the amine is preferably free from acetylenic unsaturation. The tertiary amines may also contain non-hydrocarbon substituents or groups as long as these groups do not significantly interfere with the reaction of the high molecular weight and low molecular weight acylating agents. Such non-hydrocarbon substituents or groups include lower alkoxy, lower alkyl, mercapto, nitro, and interrupting groups such as —O— and —S— (e.g., as in such groups as —CH$_2$CS$_2$—X—CH$_2$CH$_2$— where X is —O— or —S—).

The monoamines can be represented by the formula

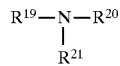

wherein $R^{19}$, $R^{20}$, and $R^{21}$ are the same or different hydrocarbyl groups. Preferably, $R^{19}$, $R^{20}$ and $R^{21}$ are independently hydrocarbyl groups of from 1 to about 20 carbon atoms.

Examples of useful tertiary amines include trimethyl amine, triethyl amine, tripropyl amine, tributyl amine, monomethyldiethylamine, monoethyldimethyl amine, dimethylpropyl amine, dimethylbutyl amine, dimethylpentyl amine, dimethylhexyl amine, dimethylheptyl amine, dimethyloctyl amine, dimethylnonyl amine, dimethyldecyl amine, dimethyphenyl amine, N,N-dioctyl-1-octanamine, N,N-didodecyl-1-dodecanamine tricoco amine, trihydrogenated-tallow amine, N-methyl-dihydrogenated tallow amine, N,N-dimethyl-1-dodecanamine, N,N-dimethyl-1-tetradecanamine, N,N-dimethyl-1-hexadecanamine, N,N-dimethyl-1-octadecanamine, N,N-dimethylcocoamine, N,N-dimethylsoyaamine, N,N-dimethylhydrogenated tallow amine, etc.

Useful alkanol amines are represented by the formula

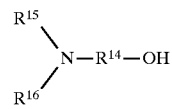

and are described above as (b) in the first emulsifier disclosure.

Useful polyamines include the alkylene polyamines discussed above as well as alkylene polyamines with only one or no hydrogens attached to the nitrogen atoms. Thus, the alkylene polyamines include those conforming to the formula:

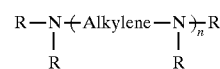

wherein n is from 1 to about 10, preferably from 1 to about 7; each R is independently a hydrogen atom, a hydrocarbyl group or a hydroxy-substituted hydrocarbyl group having up to about 700 carbon atoms; preferably up to about 100 carbon atoms, more preferably up to about 50 carbon atoms, more preferably up to about 30 carbon atoms; and the "Alkylene" group has from 1 to about 18 carbon atoms, preferably from 1 to about 4 carbon atoms, with the preferred Alkylene being ethylene or propylene.

The third emulsifier can be prepared by initially reacting the high and low molecular weight acylating agents with the coupling component (e) to form an intermediate, and thereafter reacting said intermediate with amine (f) to form the desired emulsifier which is a salt.

The ratio of reactants utilized in the preparation of the third emulsifier may be varied over a wide range. Generally, for each equivalent of each of the high and low molecular weight acylating agents, at least about 0.5 equivalents of coupling component (e) is used. From about 0.1 to about 2 equivalents or more of amine (f) are used for each equivalent of the high and low molecular weight acylating agents, respectively. The upper limit of coupling component (e) is about 2 equivalents of coupling component (e) for each equivalent of high molecular weight acylating agent, and about 2 equivalents of coupling component (e) for each equivalent of low molecular weight acylating agents. Generally the ratio of equivalents of high to low molecular weight acylating agents is about 0.5 to about 2, with about 1:1 being preferred. Preferred amounts of the reactants are about 2 equivalents of the coupling component (e) and from about 0.1 to about 2 equivalents of amine (f) for each equivalent of each of the high and the low molecular weight acylating agents.

The number of equivalents of the high and the low molecular weight acylating agents depends on the total number of carboxylic functions present in each. In determining the number of equivalents for each of the high and the low molecular weight acylating agents, those carboxyl functions which are not capable of reacting as a carboxylic acid acylating agent are excluded. In general, however there is one equivalent of the high molecular weight acylating agent and low molecular weight acylating agent for each carboxy group in these acylating agents. For example, there would be two equivalents in an anhydride derived from the reaction of one mole of olefin polymer and one mole of maleic anhydride. Conventional techniques are readily available for determining the number of carboxyl functions (e.g., acid number, saponification number) and, thus, the number of equivalents of each of the high and the low molecular weigh acylating agents can be readily determined by one skilled in the art.

An equivalent weight of a polyamine is the molecular weight of the polyamine divided by the total number of nitrogens present in the molecule. If the polyamine is to be used as coupling component (e), tertiary amino groups are not counted. On the other hand, if the polyamine is to be used as amine (f), tertiary amino groups are counted. Thus, ethylene diamine has an equivalent weight equal to one-half of its molecular weight; diethylene triamine has an equivalent weight equal to one-third its molecular weight. The equivalent weight of a commercially available mixture of polyalkylene polyamine can be determined by dividing the atomic weight of nitrogen (14) by the % N contained in the polyamine; thus, a polyamine mixture having a % N of 34 would have an equivalent weight of 41.2. An equivalent weight of ammonia or a monoamine is its molecular weight.

An equivalent weight of polyhydric alcohol is its molecular weight divided by the total number of hydroxyl groups present in the molecule. Thus, an equivalent weight of ethylene glycol is one-half its molecular weight.

An equivalent weight of a hydroxyamine which is to be used as coupling component (e) is its molecular weight divided by the total number of —OH, >NH and —NH$_2$ groups present in the molecule. Thus, methylethanolamine when used as coupling component (e) has an equivalent weight equal to one-half its molecular weight. On the other hand, if the hydroxyamine is to be used as amine (f), an equivalent weight thereof would be its molecular weight divided by the total number of nitrogen groups present in the molecule. Thus, methylethanolamine, when used as amine (f), would have an equivalent weight equal to its molecular weight; ethanolamine would also have an equivalent weight equal to its molecular weight.

The high and low molecular weight acylating agents can be reacted with coupling component (e) according to conventional ester- and/or amide-forming techniques. This normally involves heating the high and low molecular weigh acylating agents with coupling component (e), optionally in the presence of a normally liquid, substantially inert, organic liquid solvent/diluent. Temperatures of at least about 30° C. up to the decomposition temperature of the reaction component and/or product having the lowest such temperature can be used. This temperature is preferably in the range of about 50° C. to about 130° C., more preferably about 80° C. to about 100° C. when the high and low molecular weight acylating agents are anhydrides. On the other hand, when the high and low molecular weight acylating agents are acids, this temperature is preferably in the range of about 100° C. to about 300° C. with temperatures in the range of about 125° C. to about 250° C. often being employed.

The following are specific examples of the preparation of the third emulsifier.

EXAMPLE (C3)-1

Added to a flask are 931 parts (0.83 moles) of the succinic anhydride described in Example C-1, 694 parts mineral oil, and 273 parts (0.83 moles) of a low molecular weight hydrocarbyl-substituted succinic anhydride derived from one mole of a C$_{16-18}$ alpha-olefin and one mole of maleic anhydride. The contents are heated to a temperature of 93° C. with stirring and maintained at that temperature for one hour. This is followed by the addition of 51.5 parts (0.83 moles) of ethylene glycol. The mixture is maintained at a temperature of 93°–105° C. for 2 hours. Added are 148 parts (1.66 moles) of dimethylethanolamine to the mixture over a period of 0.5 hour.

The mixture is maintained at 93°–104° C. for 2.5 hours then cooled to 70° C. to provide the desired product containing 33% oil.

EXAMPLE (C3)-2

Added to a flask are 1370 parts of polyisobutylene (number average molecular weight=1200), substituted succinic anhydride, 260 parts of a low molecular weight hydrocarbyl-substituted succinic anhydride derived from one mole of a C$_{12}$ alpha-olefin and one mole of maleic anhydride, and 104 parts of neopentyl glycol and are reacted under ester-forming conditions to form an intermediate product. The addition of 234 parts of diethylethanolamine are reacted with the intermediate product under salt-forming conditions to form a desired salt composition.

EXAMPLE (C3)-3

Added to a flask are 1120 parts of the polyisobutylene substituted succinic anhydride identified in Example 1, 260 parts of a low molecular weight hydrocarbyl-substituted succinic anhydride derived from one mole of a C$_{12}$ alpha-olefin and one mole of maleic anhydride, and 104 parts of neopentyl glycol and are reacted under ester-forming conditions to form an intermediate product. The addition of 234 parts of diethylethanolamine are reacted with the intermediate product under salt-forming conditions to form a desired salt composition.

EXAMPLE (C3)-4

Added to a flask are 1370 parts of the polyisobutylene substituted succinic anhydride identified in Example 2, 325 parts of a low molecular weight hydrocarbyl-substituted succinic anhydride derived from one mole of a C$_{16}$ alpha-olefin and one mole of maleic anhydride, and 104 parts of neopentyl glycol are and reacted under ester-forming conditions to form an intermediate product. The addition of 234 parts of diethylethanolamine are reacted with the intermediate product under salt-forming conditions to form a desired salt composition.

EXAMPLE (C3)-5

Added to a flask are 1120 parts of the polyisobutylene substituted succinic anhydride identified in Example 1, 325 parts of a low molecular weight hydrocarbyl-substituted succinic anhydride derived from one mole of a C$_{16}$ alpha-olefin and one mole of maleic anhydride, and 75 parts of N-methylethanolamine and are reacted under ester-amide-forming conditions to form an intermediate product. The addition of 298 parts of triethanolamine are reacted with the intermediate product under salt-forming conditions to form a desired salt composition.

EXAMPLE (C3)-6

The procedure of Example (C3)-1 is followed except that all the mineral oil is replaced with an equal amount of a C$_{16-18}$ isomerized alpha olefin.

The compositions of the present invention may further contain (D) at least one weighting agent and/or (E) at least one clay.

(D) Weighting Agents

Weighting agents increase density of drilling muds and include galena (PbS), hematite (Fe$_2$O$_3$), magnetite (Fe$_3$O$_4$), ilmenite (FeTiO$_3$), barite (BaSO$_4$), siderite (FeCO$_3$), celestite (SrSO$_4$), dolomite (CaMg(CO$_3$)$_2$), and calcite (CaCO$_3$). Particularly useful weighting agents include barium sulfate and iron oxide. Weighting agents may also be soluble salts such as sodium chloride, sodium bromide, sodium carbonate, potassium chloride, potassium carbonate, calcium bromide, zinc chloride, and zinc bromide. The weighting agents may be present in an amount from about 20, or about 100, or about 250, to about 900, or to about 700, or to about 600. In one embodiment, the weighting agent is present in an amount from about 300 to about 500 or about 400 pounds per barrel (PPB).

(E) Clays

The compositions may also contain commercial clays such as bentonite, attapulgite, sepiolite, montmorillonite, hectorite, saponite, and illite. Montmorillonite, bentonite and attapulgite are preferred, with mortmorillonite more preferred. These clays are ordinary water wetable clays and are not treated to covert them into organophilic clays. The clays may be present in an amount from about 1, or about 2 up to about 10, or to about 8 pounds per barrel (PPB).

The following states the ranges of components (A) to (C) in parts by weight

| Component | Generally | Preferred | Most Preferred |
|---|---|---|---|
| (A) | 20–70 | 20–50 | 20–30 |
| (B) | 10–60 | 30–60 | 40–60 |
| (C) | 10–40 | 15–35 | 20–30 |

It is understood that other components besides (A), (B) and (C) may be present within the composition of this invention.

Water is present in the composition in an amount of about 10 to 95 parts by weight and the (A), (B) and (C) components are present in the composition in an amount of from about 5 to about 90 parts by weight, wherein the total parts by weight of water, and components (A), (B) and (C) is 100 parts.

The components of this invention are blended together according to the above ranges. Example 1 below is a concentrate containing the (A), (B) and (C) components.

EXAMPLE 1

Added to a mixing vessel are 500 parts of dioleyl phosphite, as component (B). Stirring is begun and slowly added is 250 parts Sunyl 80 oil, as component (A1). When the addition is complete and uniform, 250 parts of the material of Example (C3)-1 is slowly added with mixing and mixed until uniform.

EXAMPLE 2

The procedure of Example 1 is repeated, except that all the Sunyl 80 oil is replaced with an internalized alpha olefin mixture containing from 16 to 18 carbon atoms as component (A3).

EXAMPLE 3

Added to a mixing vessel are 500 parts of dioleyl phosphite, 250 parts of an internalized alpha olefin mixture containing from 16 to 18 carbon atoms which is slowly added with stirring. When the addition is complete and uniform, 250 parts of the material of Example (C3)-6 is added and mixed until uniform.

A first baseline drilling fluid is prepared by slowly introducing 8.75 parts bentonite clay into 132.88 parts of tap water with moderate shear using a mixer similar to a Hamilton Beach® mixer. The bentonite clay is allowed to hydrate for 16 hours.

In a second container 0.75 parts polyionic cellulose (SAC) available from Aqualon is slowly added to 59.06 parts tap water with moderate shear using a Hamilton Beach type mixer. This mixture is permitted to hydrate for at least 2 hours.

In a third container 0.5 parts partially hydrolyzed polyacrylamide (PHPA) available from Welchem Inc., is slowly added to 103.36 parts tap water with moderate shear using a Hamilton Beach type mixer. This mixture is permitted to hydrate for at least 2 hours.

After prehydration, the above three mixtures are combined with moderate shear in a Hamilton Beach® type mixture. Slowly added is 33.6 parts of potassium chloride. After mixing for five minutes, 165.7 parts of barite, a barium sulfate available from Baroid Drilling Fluids, Inc., is added and mixed until uniform.

Example 1A contains the first baseline drilling fluid and 4 parts of the product of Example 1. Coefficient of friction values are generated for the first baseline drilling fluid and Example 1A and a percent reduction of the coefficient of friction is determined. Table I summarizes these results.

TABLE I

| Example | Coefficient of Friction | Percent Reduction |
|---|---|---|
| First Baseline Fluid | 0.268 | — |
| Example 1A | 0.184 | 31.3 |

A second baseline drilling fluid is prepared by slowly introducing 8.18 parts bentonite clay into 79.50 parts of tap water with moderate shear using a Hamilton Beach type mixer. The bentonite clay is allowed to hydrate for 16 hours.

To the prehydrated bentonite clay is added 0.9 parts ferrochrome lignosulfonate, 0.09 parts sodium hydroxide and 13.63 parts rev dust (calcium montmorillonite clay) with moderate shear until uniform to form a prehydrated material.

Added to a vessel are 11.39 parts sea salt available from Aquarium Systems and 265.15 parts tap water. The contents are mixed until dissolved. To this salt water solution is added the prehydrated material of hydrated bentonite, ferrochrome lignosulfonate, sodium hydroxide and rev dust. An additional 4.13 parts sea salt is added and the contents are mixed with moderate shear on a Hamilton Beach type mixer for 5 minutes until uniform.

Example 2A contains the second baseline drilling fluid and 4 parts of the product of Example 1. Example 2B contains the second baseline drilling fluid and 5 parts of the product of Example 1. Coefficient of friction values are generated for the second baseline drilling fluid, Example 2A and Example 2B and a percent reduction of the coefficient of friction is determined. Table II summarizes these results.

TABLE II

| Example | Coefficient of Friction | Percent Reduction |
|---|---|---|
| Second Baseline Fluid | 0.2201 | — |
| Example 2A | 0.1705 | 22.54 |
| Example 2B | 0.1349 | 38.35 |

Example 2AA contains the second baseline drilling fluid and 4 parts of the product of Example 2. Example 2BB contains the second baseline drilling fluid and 5 parts of the product of Example 2. Coefficient of friction values are generated for the second baseline drilling fluid, Example 2AA and Example 2BB and a percent reduction of the coefficient of friction is determined. Table III summarizes these results.

TABLE III

| Example | Coefficient of Friction | Percent Reduction |
| --- | --- | --- |
| Second Baseline Fluid | 0.2201 | — |
| Example 2AA | 0.1716 | 22.04 |
| Second Baseline Fluid | 0.2176[1] | — |
| Example 2BB | 0.1236 | 43.20 |

[1]The second baseline fluid of Tables II, III and IV is of the same composition. The coefficient of friction values are different due to the fact that these values were determined on different days. Variation in the coefficient of friction value of the baseline is due to changes in temperature and also the age of the fluid. However, within each Table, the coefficient of friction values are run at the same time.

Example 3A contains the second baseline drilling fluid and 5 parts of the product of Example 3. Coefficient of friction values are generated for the second baseline drilling fluid and Example 3A and a percent reduction of the coefficient is determined. Table IV summarizes these results.

TABLE IV

| Example | Coefficient of Friction | Percent Reduction |
| --- | --- | --- |
| Second Baseline Fluid | 0.2397 | — |
| Example 3A | 0.1548 | 35.42 |

TESTING THE COEFFICIENT OF FRICTION

The coefficient of friction of the prepared drilling fluid was determined using an OFITE Lubricity Tester. OFITE is a Registered Trademark of OFI Testing Equipment, Inc. This is a standard instrument designed for determining the coefficient of friction of drilling fluids and lubricant additives. In the standard test of drilling fluids, a hardened steel block and a ring are placed in contact with each other in the presence of the fluid to be tested. A load of 150 inch pounds is placed upon a level arm which applies pressure of between 5,000 and 10,000 pounds per square inch on the fluid to be tested which is between the block and the ring. The ring is rotated at 60 RPM.

The present invention is also directed to a method, comprising the steps of:
introducing into a well borehole an oil-in-water emulsion composition, comprising a mixture of a water and
(A) at least one oil comprising
(1) a natural oil or synthetic triglyceride of the formula $$\begin{array}{l}CH_2-O-\overset{\overset{O}{\|}}{C}-R^1\\ \quad\;\;\;\;CH-O-\overset{\overset{O}{\|}}{C}-R^2\\ \quad\;\;\;\;CH_2-O-\overset{\overset{O}{\|}}{C}-R^3\end{array}$$

wherein $R^1$, $R^2$ and $R^3$ are independently saturated or unsaturated aliphatic groups that contain from about 7 to about 23 carbon atoms;
(2) a synthetic ester base oil comprising the reaction of a monocarboxylic acid of the formula $$R^4COOH$$

or a dicarboxylic acid of the formula $$\begin{array}{l}R^5-CH-COOH\\ \quad\;\;\;\;(CH_2)_m\\ \quad\;\;\;\;CH_2COOH\end{array}$$

or an aryl carboxylic acid of the formula $$R^6-Ar(COOH)_p$$

wherein $R^4$ is a hydrocarbyl group containing from about 1 to about 23 carbon atoms, $R^5$ is hydrogen or a hydrocarbyl group containing from about 4 to about 50 carbon atoms, $R^6$ is hydrogen or a hydrocarbyl group containing from 1 up to about 24 carbon atoms, m is an integer of from 0 to about 8, and p is an integer of from 1 to 4; with an alcohol of the formula $$R^7[O(CH_2CHO)_gH]_f$$
$$\quad\;\;\;\;\overset{R^8}{|}$$

wherein $R^7$ is an aliphatic, alkoxy or hydroxyalkoxy group containing from 1 to about 30 carbon atoms or an aromatic group containing from 6 to about 18 carbon atoms, $R^8$ is hydrogen or an alkyl group containing 1 or 2 carbon atoms, g is from 0 to about 40 and f is from 1 to about 6;
(3) an olefin of the formula $R^9CH=CHR^{10}$ wherein $R^9$ is hydrogen or a straight chained alkyl group containing from 1 to 10 carbon atoms and $R^{10}$ is a branched or straight chained alkyl group containing from 1 to 10 carbon atoms, with the proviso that the sum of the carbon atoms of $R^9$ and $R^{10}$ is at least 8; or
(4) a polyolefin;
(B) at least one phosphite ester of the formula

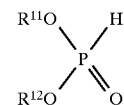

wherein $R^{11}$ and $R^{12}$ are independently aliphatic, aryl or aliphatic substituted aryl groups that independently contain from 6 to 30 carbon atoms; and
(C) at least one emulsifier; and
drilling the well borehole.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:
1. An oil-in-water emulsion composition, comprising a mixture of water and
(A) at least one oil comprising
(1) a natural oil wherein the natural oil is a genetically modified vegetable oil triglyceride of the formula

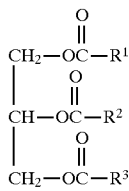

wherein $R^1$, $R^2$ and $R^3$ are independently saturated or unsaturated aliphatic groups that contain from about 7 to about 23 carbon atoms and wherein $R^1$, $R^2$ and $R^3$ are at least 60 percent monounsaturated wherein the monounsaturated character is due to an oleic acid residue and further wherein an oleic acid moiety: linoleic acid moiety ratio is from 2 up to about 90;

(B) at least one phosphite ester of the formula

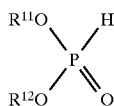

wherein $R^{11}$ and $R^{12}$ are independently aliphatic, aryl or aliphatic substituted aryl groups that independently contain from 6 to 30 carbon atoms; and (C) an emulsifier comprising (C3) the reaction product formed by the coupling of a high molecular weight acylating agent a of the formula

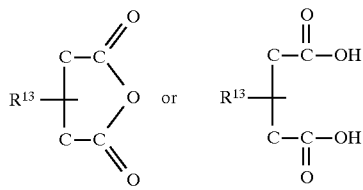

and a low molecular weight acylating agent (d) of the formula

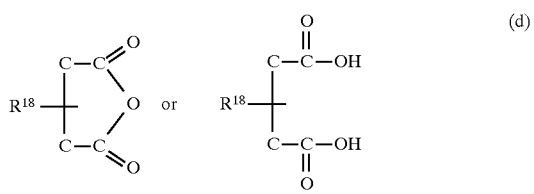

wherein $R^{13}$ is a hydrocarbyl group containing from 20 to about 500 carbon atoms, wherein $R^{18}$ is a hydrocarbyl group that contains from 1 up to 18 carbon atoms, wherein the coupling of a and d is accomplished with a coupling component (e) comprising (i) two or more primary amino groups, (ii) two or more secondary amino groups, (iii) at least one primary amino group and at least one secondary amino group, (iv) at least two hydroxyl groups, or (v) at least one primary or secondary amino group and at least one hydroxyl group to form an intermediate and reacting said intermediate with an amine (f) comprising ammonia, primary amines, secondary amines, hydroxyamines, primary and secondary monoamines and tertiary mono- and polyamines.

2. The composition of claim 1 wherein the triglyceride is at least 70 percent monounsaturated.

3. The composition of claim 1 wherein the triglyceride is at least 80 percent monounsaturated.

4. The composition of claim 1 wherein the genetically modified vegetable oil comprises high oleic sunflower oil, high oleic safflower oil, high oleic corn oil, high oleic soybean oil, high oleic rapeseed oil, high oleic cottonseed oil, high oleic canola oil or high oleic peanut oil.

5. The composition of claim 1 wherein within (B), $R^{11}$ and $R^{12}$ are aliphatic groups that independently contain from 8 to 18 carbon atoms.

6. The composition of claim 1 wherein within (B) the phosphite ester is oleyl phosphite.

7. The composition of claim 1 wherein $R^{18}$ is derived from an alpha olefin comprising $C_{15-18}$ alpha olefins, $C_{12-16}$ alpha olefins, $C_{14-16}$ alpha olefins, $C_{14-18}$ alpha olefins and $C_{16-18}$ alpha olefins.

8. The composition of claim 1 wherein the coupling component (e) comprises at least one polyamine.

9. The composition of claim 1 wherein the coupling component (e) comprises at least one polyol of the formula $R^{17}(OH)_q$ wherein $R^{17}$ is a hydrocarbyl group containing from 2 to about 40 carbon atoms and q is an integer of from 2 to about 6.

10. The composition of claim 1 wherein the coupling component (e) comprises ethylene glycol.

11. The composition of claim 1, further comprising (D) at least one weighting agent or (F) at least one clay.

12. The composition of claim 11 wherein the weighting agent (D) comprises barium sulfate, iron oxide, calcium chloride, calcium bromide, zinc bromide, zinc chloride or sodium chloride.

13. The composition of claim 11 wherein the clay (E) comprises bentonite, attapulgite, sepiolite, montmorillonite, hectorite, saponite, and illite.

14. The composition of claim 1 wherein the water is present in the mixture in an amount of about 10 to about 95 parts by volume, and the (A)–(C) is present in the mixture in an amount from about 5 to about 90 parts by volume, wherein the total parts by volume of water and (A)–(C) is 100 parts.

15. The composition of claim 1 where the water is a continuous phase and the oil (A) and the components soluble within the oil is a discontinuous phase.

16. A method comprising the steps of: introducing into a well borehole an oil in water emulsion composition according to claim 1, and drilling the well borehole.

* * * * *